March 20, 1956
T. E. CAREY
2,739,118
FILTERING MEDIA
Filed Aug. 1, 1952
3 Sheets-Sheet 1
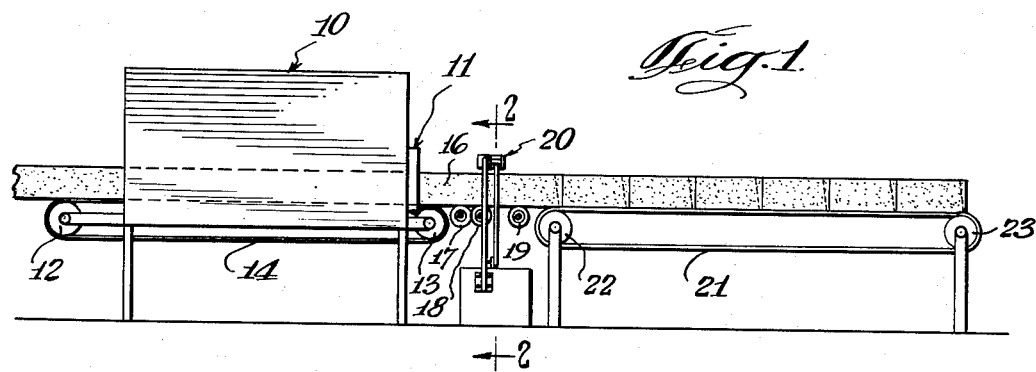
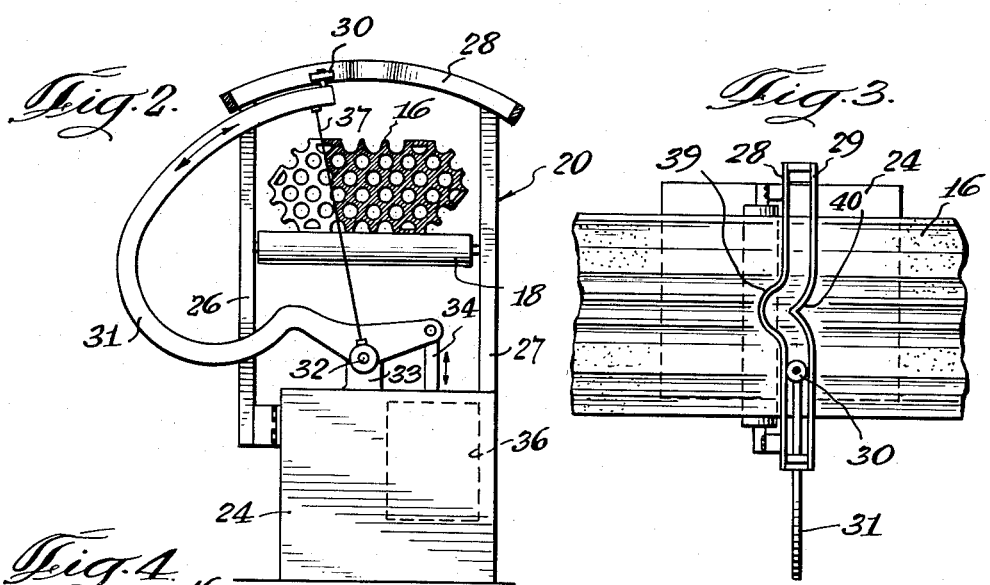
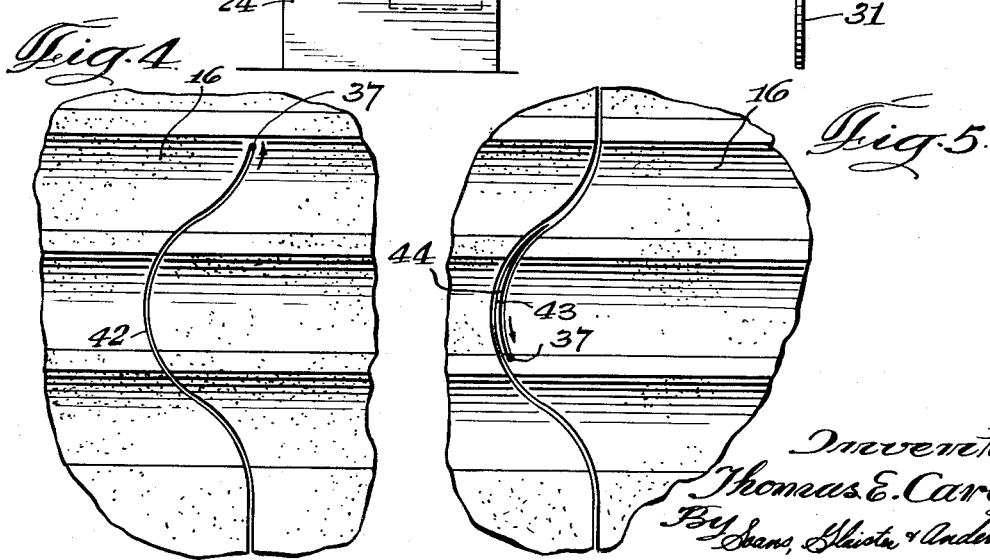
Inventor
Thomas E. Carey
By Sears, Glista & Anderson
Attorneys March 20, 1956 T. E. CAREY 2,739,118
FILTERING MEDIA
Filed Aug. 1, 1952 3 Sheets-Sheet 2
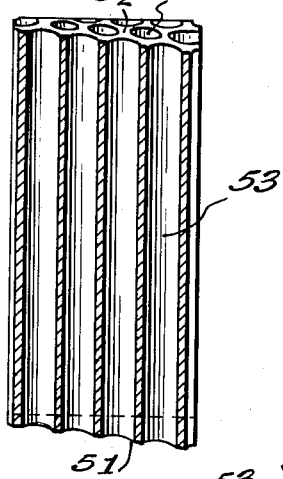
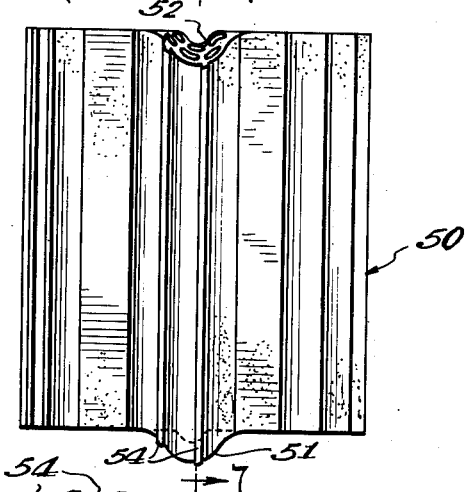
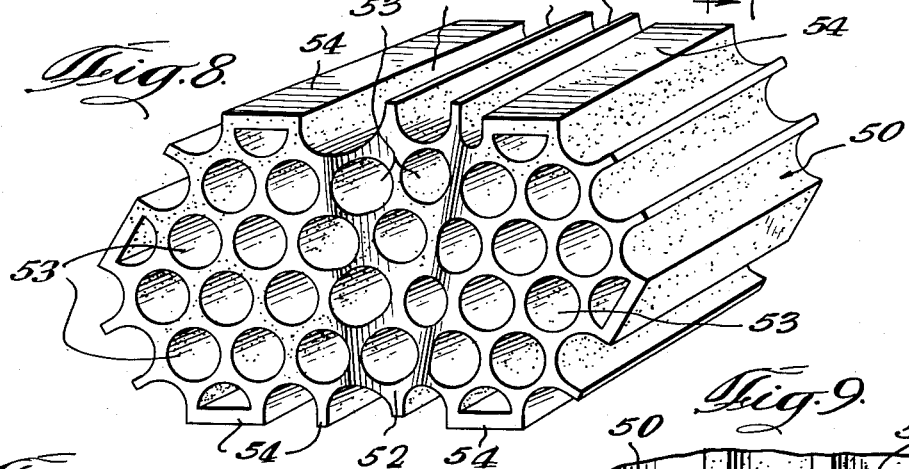
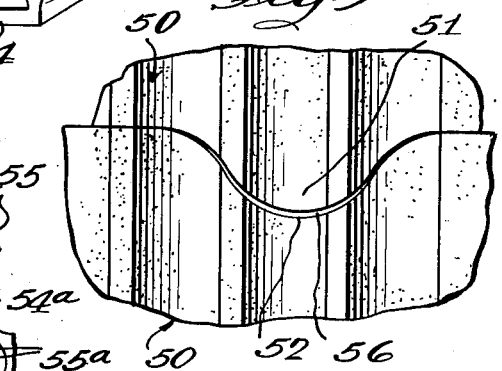
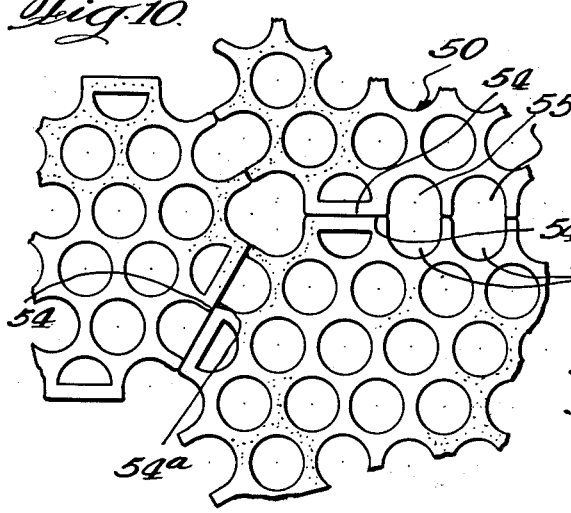
Inventor
Thomas E. Carey
By
Evans, Plaister & Anderson
Attorneys

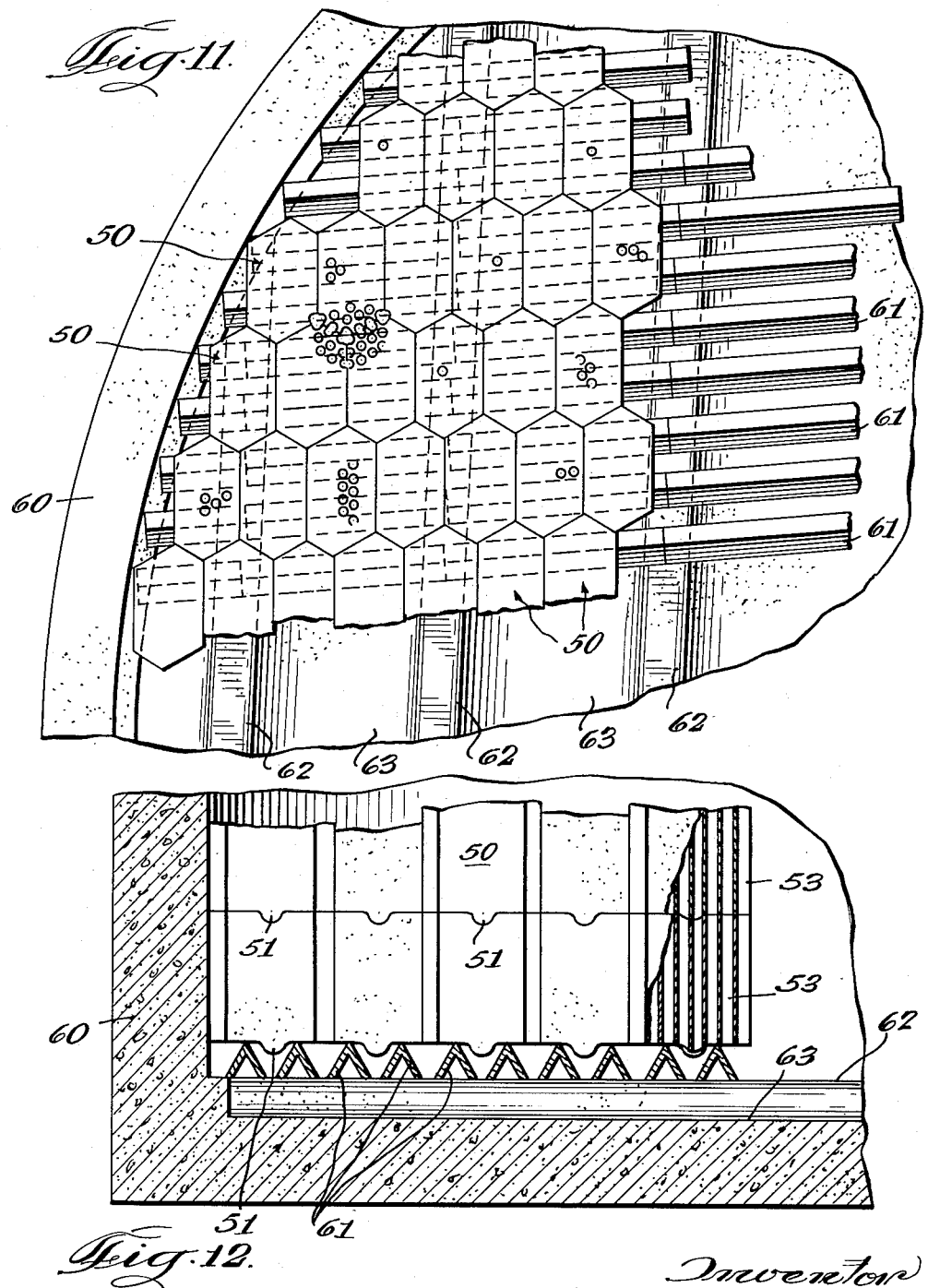

United States Patent Office 2,739,118
Patented Mar. 20, 1956

2,739,118
FILTERING MEDIA

Thomas E. Carey, Red Wing, Minn., assignor to Red Wing Sewer Pipe Corporation, Red Wing, Minn., a corporation of Minnesota Application August 1, 1952, Serial No. 302,095

9 Claims. (Cl. 210—7)

The present invention relates to apparatus for effecting the biological purification of sewage and similar waste materials and is particularly concerned with an improved type of filtering media especially designed for use in the biological purification apparatus of the type known as a trickling filter.

In the usual trickling filter plant, the sewage or other waste material is first passed into a settling tank or a mechanical clarifier where suspended solids are settled out. The effluent from the mechanical clarifier is passed to a trickling filter where the sewage is acted upon by aerobic bacteria which oxidize and nitrify the waste components to render these components innocuous to marine life. The effluent from the trickling filter is then passed through a secondary clarifier usually of the mechanical type to remove the sludge and other solids. The effluent from the secondary clarifier may be disposed of in any suitable manner if the treatment lowers the biological oxygen demand (B. O. D.) of the effluent to a safe value.

One of the earlier filtration assemblies employing the trickling filter technique involved the use of stones of graded size as the filter media. The labor and expense of grading stone particles, coupled with the undesired channeling effects produced when using natural stone as a filtering medium made this type of installation commercially inefficient and uneconomical.

One of the more significant improvements in the design of filter units for sewage treatment was the development of nonabsorbent, pre-formed, vitrified, salt-glazed clay units which could be arranged in stacked arrangement within the treating tank. Such filter units are described in U. S. Patent No. 2,183,657, issued to Arthur A. Page on December 19, 1939. While this type of unit minimizes the channeling problems encountered with units employing graded rocks, and provides relatively large contact areas per unit of volume, there has been difficulty experienced in stacking the filter elements properly within the treating chamber.

In order to solve this stacking problem, dowels or similar means have been provided between the fluid passageways in the vertically aligned filtering units. The use of dowels or the like, however, has the disadvantage that the effective volume for passage of the liquid through the filter units is decreased through the insertion of the dowel pins. The use of dowels also requires hand positioning of the dowels within the passages, thereby substantially increasing the cost and time involved in assembly.

To overcome these difficulties, the present invention provides filter media composed of blocks of vitrified salt-glazed clay or similar inert material, each of the filter media being provided with integral positioning means which cooperate with depressions or sockets in vertically adjacent filter media to enable the media to be positioned in stacked vertical alignment.

An object of the present invention is to provide an improved filter medium having integral positioning means formed thereon to enable a plurality of such media to be stacked in vertical alignment without decreasing the effective void area in each of the filter media.

Another object of the present invention is to provide an improved filtering assembly consisting of a plurality of relatively rigid blocks, each of the blocks having spaced channels formed therein and each of the blocks having a protuberance and a depression at opposite ends thereof which cooperate with similar depressions and protuberances on adjoining blocks to form an interlocked, stacked arrangement of filter elements.

Still another object of the present invention is to provide an improved filter medium of generally polygonal configuration, the filter medium being arranged to engage similarly shaped filter media in abutting contact along the side faces of the media.

Other objects and features of the present invention will be apparent to those skilled in the art from the following description of the attached sheets of drawings in which:

Figure 1 is a view, with parts in elevation, of the assembly employed for shaping and cutting extruded clay into filter blocks;

Figure 2 is an enlarged view, with parts in elevation, taken substantially along the line 2—2 of Figure 1;

Figure 3 is a plan view of the cutting mechanism illustrated in Figure 2;

Figure 4 is greatly enlarged, plan view of the extruded clay, illustrating the path of the cutting wire through the clay in the first pass of the wire therethrough;

Figure 5 is a view similar to Figure 4, and illustrates the return path of the cutting wire;

Figure 6 is a side elevational view of a filter medium of the present invention;

Figure 7 is a cross-sectional view of the filter medium taken substantially along the line 7—7 of Figure 6;

Figure 8 is a perspective view of the filtering medium;

Figure 9 is an elevational view, greatly enlarged, illustrating the manner in which two vertically aligned filtering blocks are engaged;

Figure 10 is a fragmentary plan view of the honeycomb structure produced by the engagement of a plurality of the filter media;

Figure 11 is a fragmentary plan view of the filter media in stacked engagement within a treating tank and Figure 12 is a fragmentary side elevational view of the tank and filter media illustrated in Figure 11.

In Figure 1, reference numeral 10 indicates generally an extruding machine for shaping clay or other relatively inert material, the extruding machine 10 being provided with an extrusion orifice, generally indicated at 11. Clay or other extrudable material, while still in a relatively plastic state, is passed through the extruding machine 10 by means of a conveyor system, including spaced roller 12 and 13 and a moving, endless belt 14 trained therearound. As the clay passes through the extruding machine 10, it is shaped into a generally polygonal configuration best illustrated in Figures 2 and 8 of the drawings. The specific shape of the extruded clay forms an important feature of the present invention and will be described hereinafter in more specific detail.

The extruded strip 16 leaving the extrusion orifice 11 is then severed into appropriate lengths while the strip is supported by a plurality of horizontally spaced rollers 17, 18, and 19. The cutting mechanism for severing the strip 16 into the desired shapes has been generally indicated in Figure 1 at reference numeral 20. After cutting, the strip 16 is received on an endless conveyor belt 21, supported between a pair of rollers 22 and 23, which delivers the cut filter blocks to driers and then to kilns where the blocks are subjected to a high temperature treatment to produce a relatively rigid, vitrified, salt-glazed clay block.

One of the features of the present invention resides in providing arcuate depressions and protuberances on each of the filter blocks so that the blocks may be vertically aligned and interlocked automatically as an incident to the stacking of the blocks during the construction of the filter. The cutting means 20, best illustrated in Figures 2 and 3 of the drawings, is arranged to cut a generally frusto-conical protuberance into each of the filter blocks. At the same time, the parting line provided by the action of the cutting means leaves a generally frusto-conical depression in the next adjoining filter block. As a practical matter, it is impossible to achieve identical shrinkage characteristics in each of a number of filter blocks cut from the same extruded strip. In other words, some difference in shrinkage is to be expected between filter blocks cut from the same strip of extruded material, even though the strip itself might be considered to have a homogeneous composition. To compensate for this difference in shrinkage characteristics, the individual filter blocks are cut so that the maximum depth of the depression formed in each of the filter blocks will be slightly greater than the maximum heighth of the protuberance, thereby providing an annular clearance between the protuberance on one filter block and the base of the depression which receives it.

The cutting mechanism 20 illustrated in Figures 2 and 3 includes a frame 24, to which is secured a pair of support arms 26 and 27. Supported between the arms 26 and 27 is an arcuate guideway consisting of a pair of spaced guide strips 28 and 29 (Figure 3). The spaced guide strips 28 and 29 receive a roller 30, the latter being supported on an oscillating arm 31. The arm 31 is arranged for pivotal movement about a shaft 32 journalled for rotation within a bearing 33 on the frame 24. The arm 31 is pivoted about the shaft by the action of a reciprocating rod 34 secured to an end of the arm 31 beyond the shaft 32. The reciprocating arm is actuated in timed relation to the passage of the strip 16 along the conveying system by any suitable means such as a screw mechanism, a hydraulic cylinder, or the like, such mechanism being generally indicated at numeral 36.

The cutting element employed consists of a relatively taut cutting wire 37 one end of which is secured to an end of the arm 31, while the opposite end of the wire 37 is fastened to a stationary portion of the cutting assembly.

As the arm 31 is oscillated by the reciprocation of the rod 34, the roller 30 follows the configuration of the guide strips 28 and 29 and the roller 30, and hence the arm 31, is displaced laterally by arcuate portions 39 and 40 formed on the strips 28 and 29, respectively. If there were no resistance to the travel of the cutting wire 37 between the guide strips 28 and 29, wire 37 would describe a generally conical path since one end of the wire is fixedly secured to the cutting assembly frame, while opposite end is describing a semicircular arc. However, the passage of the wire through the clay strip 16 causes a tensioning of the wire, due to the presence of the moving clay, resulting in a slight deviation from this theoretical path. The actual path of the wire 37 in the first pass of the wire through the block 16 is illustrated in Figure 4 of the drawings.

As seen in Figure 4, the actual path of the wire 37 through the strip 16 provides a substantially semicircular cut 42 in the first pass of the wire 37 through the strip 16. In the return cut, as illustrated in Figure 5, the wire 37 does not follow the exact cut made in the first cut, apparently due to the change in resistance produced by the first cut in the clay. The cut produced in the return pass of wire 37 therefore deviates from the cut 42 in the central portion of the cut. The resulting cut produced in the second pass of the wire 37 through the strip 16 has been identified in the Figure 5 at reference numeral 43. The result of these two cutting passes is the production of a generally frusto-conical depression in one of the filter blocks, and a generally frusto-conical protuberance in the adjoining filter block. By virtue of the different paths followed by the wire 37 in making the cutting passes, the effective diameter of the depression will be slightly larger than the effective diameter of the frusto-conical protuberance. It will be realized that it is not always necessary to make two cuts, particularly if the clay being cut provides a substantial pressure on the cutting element.

The structure of the filter block after cutting and firing of the clay block in a suitable furnace is best illustrated in Figures 6 through 10 of the drawings. As seen in Figure 6, the block 50 has an integral protuberance 51 extending from one end face, a frusto-conical depression 52 formed in its opposite end face.

During extrusion of the block 50, the block is provided with a plurality of longitudinally extending passages 53 throughout the length of the block, these passages 53 being ordinarily on the order of one inch in diameter. The side faces of the block 50 are also shaped to provide flat surfaces or lands 54 separated by channels 55. The flat surfaces of the lands 54 on each of the side faces of the filter block 50 are substantially in the same plane and, as illustrated in Figure 10, when a plurality of the blocks 50 are arranged in lateral engagement, the lands 54 engage similar lands 54a on adjacent filter blocks in abutting contact. When the blocks are stacked in such a honeycomb arrangement, certain of the channels 55 are in registry with similar channels 55a of adjoining blocks to provide additional passages for directing the flow of fluid through the filter media.

The vertical engagement between a pair of blocks 50 is best illustrated in the showing of Figure 9. As will be seen from an inspection of this figure, the protuberance 51 on the upper block is seated in nested engagement within the depression 52 of a lower filter block. By virtue of the differences in dimensions between the protuberance 51 and the depression 52, a small annular clearance 56 is provided between the engaged filter blocks.

The arrangement of the filter blocks 50 within the treating tank is illustrated in Figures 11 and 12 of the drawings. The filter blocks 50 are arranged in a honeycomb arrangement with the side faces of the blocks 50 being in abutting contact with similar side faces of laterally adjacent blocks. The blocks 50 are supported within a treating tank 60 by providing a series of spaced, triangular supports 61 extending in spaced relation across the base of the treating tank 60. The supports 61 themselves are bottomed on a plurality of spaced ribs 62 formed in the base of the treating tank 60, the spaces 63 between the ribs 62 defining collecting troughs from which the treated material is removed from the treating tank 60. The supports also provide an open network which permits the free flow of air through the filtering assembly necessary for the growth of the aerobic organisms.

From the foregoing, it will be appreciated that the improved filter blocks of the present invention possess several distinct advantages over comparable filter media previously employed. The provision of integral positioning means, such as the protuberances described, facilitates stacking of the filter blocks in vertical alignment while the difference in dimensions between the protuberances and the depressions which receive them allows for variation in shrinkage characteristics of the clay material forming the blocks. The configuration of the side faces of the blocks insure good lateral engagement of each block with the corresponding side faces of laterally adjoining blocks. It should also be noted that the arrangement used for interlocking blocks in vertical alignment does not decrease the effective void area in the blocks as is the case where dowel pins and the like are used as securing means, and in general, the available void area is increased on the order of about 10%.

It will be obvious to those skilled in the art that many types of cutting mechanisms other than that described in this specification can be employed in making the blocks of the invention. In fact, where the nature of the clay permits, the blocks can be severed with mechanical hand operated cutters.

I claim:

1. A filtering medium comprising a relatively rigid block having a plurality of spaced, longitudinally-extending passageways formed therein, said block having an integral protuberance extending therefrom at one end face thereof, said block also having a depression therein at the opposite end face thereof, said depression having a maximum depth in excess of the maximum heighth of said protuberance, whereby a plurality of the filtering media may be stacked together in vertical alignment with the protuberance on one block received with the depression of a vertically adjacent block while leaving a slight annular clearance between the end of said protuberance and the base of said depression, said protuberance and said depression being complementary in form and being so proportioned that the longitudinally extending passageways in superposed blocks are brought into registry with each other as an incident to the placing of such blocks one upon the other.

2. A filtering assembly comprising a plurality of superimposed, relatively rigid, polygonally shaped blocks in vertical alignment, each of said blocks having side faces including lands and channels therein, at least some of the side faces having land areas of narrow width spaced between the channels and having other land areas of substantial width, the surfaces of the lands in each of said side faces lying substantially in the same plane, each of said blocks also having an integral protuberance extending from an end face thereof and a depression in the opposite end face thereof, said blocks being stacked in end to end relationship with the protuberance on one block being received within the depression of a vertically adjacent block with the passages in each of said blocks being in registry to provide continuous passages for the flow of liquid through said filtering assembly, the side faces of laterally adjacent blocks engaging in abutting contact with the relatively wide land areas in each block cooperating with narrow land areas in laterally adjacent blocks to provide additional vertically aligned passages for the flow of liquid through said filtering assembly.

3. A filtering assembly comprising a plurality of superimposed, relatively rigid, polygonally shaped blocks in vertical alignment, each of said blocks having side faces including lands and channels therein, at least some of the side faces having land areas of narrow width spaced between the channels and having other land areas of substantial width the surfaces of the lands in each of said side faces lying substantially in the same plane, each of said blocks also having an integral frusto-conical protuberance extending from an end face thereof and a frusto-conical depression in the opposite end face thereof, said blocks being stacked in end to end relation with the protuberance on one block being received within the depression of a vertically adjacent block and the passages in each of said blocks being in registry to provide continuous passages for the flow of liquid through said filtering assembly, the side faces of laterally adjacent blocks engaging in abutting contact with the relatively wide land areas on laterally adjacent blocks and the narrow land areas in said side faces cooperating with narrow land areas in laterally adjacent blocks to provide additional passages for the flow of liquid through said filtering assembly.

4. A media element for use in the construction of biologically active filters comprising a rigid block which is of generally uniform cross sectional outline and which has a plurality of spaced, generally-parallel, longitudinally-extending passageways formed therein, the side faces of said block including spaced, generally parallel lands and channels which are disposed in side by side relationship and which extend lengthwise of said block, and at least some of the lands on each of a plurality of said faces being wider than the other lands on that face, whereby when said blocks are stacked in side by side relationship, the wider lands will cooperate with the narrower lands and the channels in adjacent blocks to provide additional longitudinally extending passageways.

5. A media element for use in the construction of biologically active filters comprising a rigid block of ceramic material which is of uniform, polygonal, cross-sectional outline and which has a plurality of spaced, generally-parallel, longitudinally-extending passageways formed therein, said passageways being separated by thin-walled sections of said block, the side faces of said block including spaced, generally-parallel, lands and channels disposed in side by side relationship and extending lengthwise of said block, at least some of the lands on each of a plurality of said faces being wider than the other lands on that face, whereby when said blocks are stacked in side by side relationship, the wider lands will cooperate with the narrower lands and the channels in adjacent blocks to provide additional longitudinally extending passageways.

6. A media element for use in the construction of biologically active filters, comprising a rigid block of ceramic material which is of generally uniform cross-sectional outline and which has a plurality of spaced, generally-parallel, longitudinally-extending passageways formed therein, one end of said block having an integral protuberance extending therefrom and the other end of said block having a complementary depression formed therein, the defining surfaces of said protuberance and said depression each comprising a portion of the surface of a cone, the axis of which is disposed at a substantial angle to the longitudinal axis of said block.

7. A media element for use in the construction of biologically active filters, comprising a rigid block of ceramic material which is of uniform, polygonal, cross-sectional outline and which has a plurality of spaced, generally-parallel, longitudinally-extending passageways formed therein, the end faces of said block including flat surfaced portions which extend at right angles to the longitudinal axis of said block, and which facilitate the stacking of said blocks in vertical alignment with each other, one end of said block having an integral protuberance extending therefrom and the other end of said block having a complementary depression formed therein, said protuberance and said depression extending entirely across the end faces of said block, and the defining surfaces of said protuberance and said depression each comprising a portion of the surface of a cone, the axis of which is disposed at a substantial angle to the longitudinal axis of said block.

8. A media element for use in the construction of biologically active filters, comprising a rigid block of ceramic material which is of uniform, polygonal, cross-sectional outline and which has formed therein a plurality of spaced, generally-parallel, longitudinally-extending passageways, separated by relatively thin walled sections of said block, and means for assuring registry of the longitudinally extending passageways in said blocks as an incident to the stacking of said blocks one upon the other, said means comprising a protuberance extending from the end face at one end of said block and a complementary depression extending into the end face at the other end of said block, the said protuberance and the said depression extending across at least a major portion of the end face of said block, the defining surface of said protuberance and the defining surface of said depression each comprising a portion of the surface of a cone, the axis of which is disposed at a substantial angle to the longitudinal axis of said block, and said depression having a maximum depth in excess of the maximum height of said protuberance, whereby when said blocks are stacked in vertical alignment, there will be a slight annular clearance between the opposing surfaces of said protuberance and said depression.

9. A media element for use in the construction of biologically active filters, comprising a rigid block of ceramic material which is of uniform, polygonal, cross-sectional outline and which has formed therein a plurality of spaced, generally-parallel, longitudinally-extending passageways, said passageways being separated by relatively thin-walled sections of said block, the end faces of said block including a flat surfaced portion which extend at right angles to the longitudinal axis of said block, and which facilitate the stacking of said blocks in vertical alignment with each other, and means for assuring registry of the longitudinally extending passageways in said blocks as an incident to the stacking of said blocks one upon the other, said means comprising a protuberance extending from the end face at one end of said block and a complementary depression extending into the end face at the other end of said block, the defining surfaces of said protuberance and said depression extending across at least a major portion of the end face of said block, the defining surface of said protuberance and the defining surface of said depression each comprising a portion of the surface of a cone, the axis of which is disposed substantially at right angles to the longitudinal axis of said block, and said depression having a maximum depth in excess of the maximum height of said protuberance, whereby when said blocks are stacked in vertical alignment, there will be a slight annular clearance between the opposing surfaces of said protuberance and said depression.

References Cited in the file of this patent

UNITED STATES PATENTS

| | | |
|---|---|---|
| 964,160 | Hammett | July 12, 1910 |
| 991,009 | Myers | May 2, 1911 |
| 1,277,832 | Beckley | Sept. 3, 1918 |
| 1,710,833 | Mirabella et al. | Apr. 30, 1929 |
| 2,141,979 | Halvorson et al. | Dec. 27, 1938 |
| 2,165,931 | Levy | July 11, 1939 |
| 2,183,657 | Page | Dec. 19, 1939 |
| 2,590,964 | Halvorson | Apr. 1, 1952 |

FOREIGN PATENTS

| | | |
|---|---|---|
| 600,550 | Great Britain | Apr. 12, 1948 |